June 23, 1925.
F. W. SPERR, JR., ET AL
1,542,971
PROCESS OF PRODUCING ALKALI METAL CARBONATES
Original Filed April 18, 1921
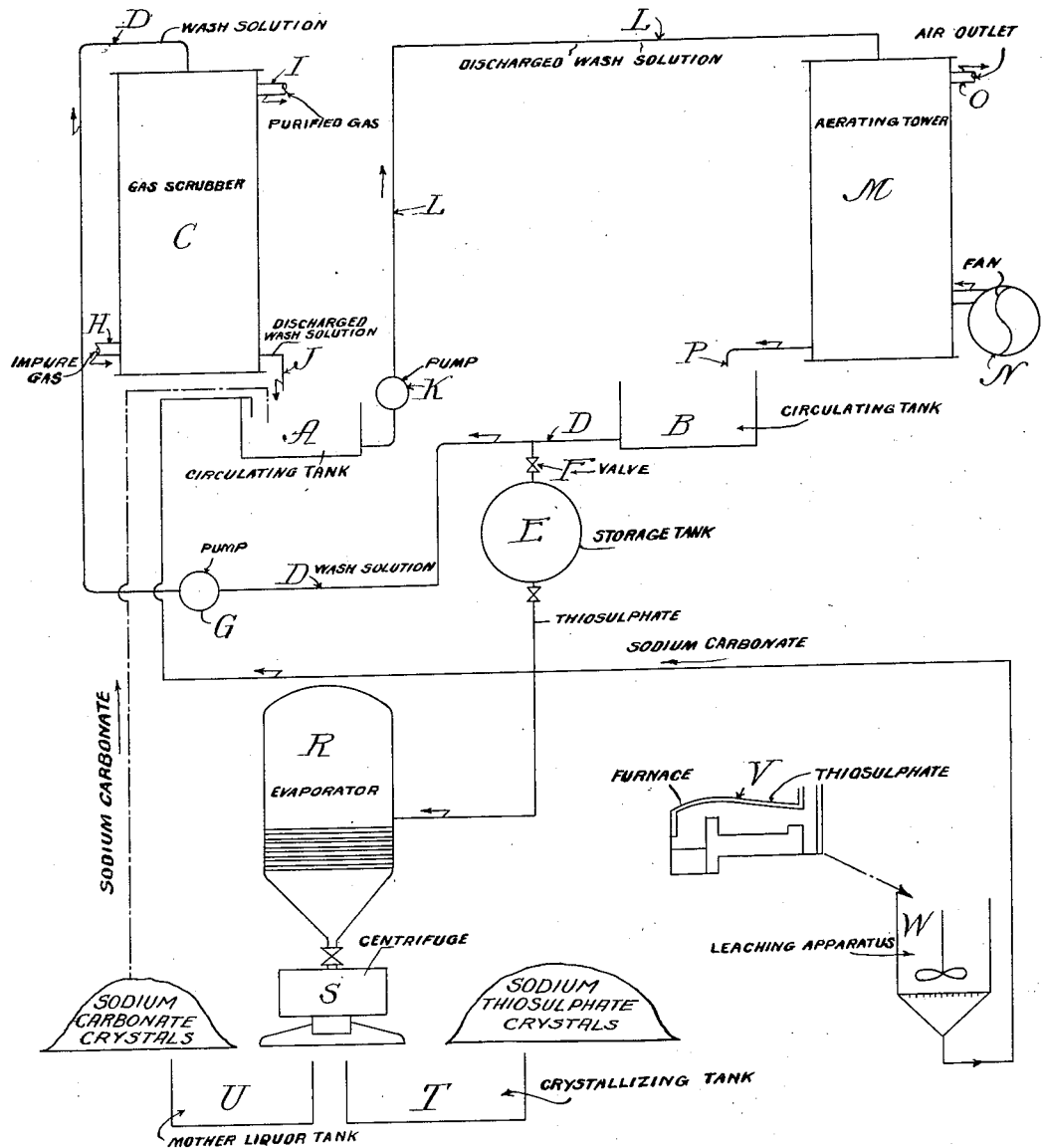

Patented June 23, 1925.

1,542,971

UNITED STATES PATENT OFFICE.

FREDERICK W. SPERR, JR., AND DAVID L. JACOBSON, OF PITTSBURGH, PENNSYLVANIA, ASSIGNORS TO THE KOPPERS COMPANY, OF PITTSBURGH, PENNSYLVANIA, A CORPORATION OF PENNSYLVANIA.

PROCESS OF PRODUCING ALKALI-METAL CARBONATES.

Application filed April 18, 1921, Serial No. 462,309. Renewed August 22, 1924.

*To all whom it may concern:*

Be it known that we, FREDERICK W. SPERR, Jr., and DAVID L. JACOBSON, citizens of the United States, residing in Pittsburgh, in the county of Allegheny and State of Pennsylvania, have invented a new and useful Improvement in Processes of Producing Alkali-Metal Carbonates, of which the following is a specification.

This invention relates to the removal of hydrogen-sulphide from gases by bringing such gases into contact with a liquid medium which may be continuously regenerated by aeration; the invention has for its object to provide for the regeneration of the secondary products of aeration that are inert with respect to the hydrogen sulphide and that cannot, without such regeneration, play any part in its removal. In the co-pending application of Frederick W. Sperr Jr., and David L. Jacobson, Serial No. 458265, April 4, 1921, there is described a process for the manufacture of alkali-metal thiosulphates in which gas, containing hydrogen sulphide, is brought into contact with an alkaline solution which is continuously circulated and aerated. The present invention contemplates the application of such a process to the substantially complete removal of hydrogen sulphide from the gas, combined with a substantially complete conservation of the alkali, by providing for the regeneration of the thiosulphate formed in the purification process, such regeneration converting the thiosulphate principally to carbonate, which may be employed for making up the alkaline solution used for treating the gas.

The gases, such as cake oven gas, water gas, and other gases, to which this process is commonly applicable, usually contain $CO_2$ which is a useful agent in the process. If, however, the gases do not originally contain $CO_2$, it may either be added artificially or else gases containing $CO_2$, such as waste stack gas, may be used in the treatment of the solution to produce the requisite amount of sodium bicarbonate.

In addition to the general objects recited above, the invention has for further objects such other improvements or advantages in operation and result as are found to obtain in the apparatus and process hereinafter described or claimed.

In the accompanying drawing, forming a part of this specification and showing, for purposes of exemplification, a preferred form and manner in which the invention may be embodied and practiced, but without limiting the claimed invention specifically to such illustrative instance or instances, the figure represents a diagrammatic representation of apparatus for carrying out the improved process of the present invention.

In the treatment of gas containing hydrogen sulphide and carbon dioxide with a solution of an alkaline purifying agent such as sodium carbonate, the following reactions occur:

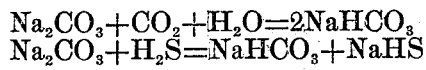

When the resulting solution containing sodium bicarbonate and sodium hydrosulphide together with unchanged sodium carbonate is aerated, part of the sodium hydrosulphide is changed to sodium thiosulphate. The remainder together with part of the sodium bicarbonate is decomposed in accordance with the following reactions:

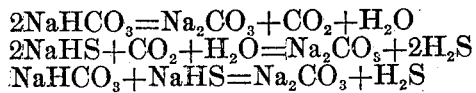

According to the invention, the alkali thiosulphate, in the present instance the sodium thiosulphate, is converted principally into sodium carbonate ($Na_2CO_3$). Some sodium sulphide ($Na_2S$) may also be formed, but since this, in solution, is readily hydrolyzed to sodium hydrosulphide (NaHS) and sodium hydroxide (NaOH), it may be returned together with the sodium carbonate to the gas purification process.

A specific application of the invention will now be described.

Circulating tanks A and B contain the alkaline solution used in the process. The process may, for example, be started with a solution containing from 3 to 5% sodium carbonate, although other alkaline compounds, such for example as potassium carbonate may be used. Circulating tank B is connected with the gas scrubber C by means of the pipe line D which has a short branch line communicating with storage tank E and controlled by valve F. The scrubber may be any well-known type of gas scrubber, for example, a so-called "benzol scrubber" filled with wooden hurdles. The solution is pumped from B by means of the pump G over the scrubber C and, containing the hydrogen sulphide absorbed from the gas, passes out through the pipe J into the circulating tank A. The gas enters the scrubber through the pipe H and passes out through the pipe I substantially free from its original hydrogen sulphide content. The solution is pumped from the tank A by pump K through pipe line L over the aerating tower M which may be an apparatus similar to the scrubber C, or may be a natural draft cooling tower in which the solution is simply aerated by being brought into contact with the atmosphere under natural draft. In the present case, there is employed a scrubber type of apparatus in which air is blown by means of the fan N. The exit air containing $H_2S$ passes out through the pipe O and may be disposed of in any desired way. The aerated solution, containing sodium thiosulphate, runs through the pipe P into the circulating tank B. The system as shown is preferably maintained in continuous operation. When the sodium thiosulphate has accumulated to a desired percentage the valve F is opened and a portion of the solution is transferred into the storage tank E. The remaining solution in the circulating system is made up to its original volume by adding the alkaline solution obtained from the subsequent treatment of the sodium thiosulphate to the contents of the tank A.

It is preferable before transferring this solution from the circulating system into the storage tank E to discontinue the addition of fresh sodium carbonate until the percentage of sodium carbonate in the circulating solution is reduced to about 1 or 2%. This will save the separation and handling of a considerable amount of sodium carbonate in the subsequent treatment of the solution. After withdrawal of the solution into the storage tank, the remaining solution should be restored at once to its original alkalinity.

The recovery of the thiosulphate from the liquor in storage tank E may be effected in any way desired, but is preferably accomplished by the process described in the co-pending application of R. E. Hall and D. L. Jacobson, Serial No. 462136, filed April 18, 1921. In this process, the liquor is treated in evaporator R until the concentrated solution has a boiling point of approximately 120° C. under atmospheric pressure. Any bicarbonate is thereby partly decomposed to carbonate, and from 80 to 90% of the total carbonate is present in solid form in the hot solution. This carbonate is separated by hot filtration or centrifuging in centrifuge S. The centrifuged solution runs into crystallizing tank T wherein it is allowed to cool. Most of the sodium thiosulphate crystallizes out and the mixture of crystals and mother liquor is returned to contrifuge S. The separated mother liquor runs into tank U. In case it contains any considerable amount of sodium thiocyanate, it may be treated for the recovery or utilization of this material and fresh sodium carbonate should be added to the circulating system to replace the equivalent of thiocyanate removed. Otherwise, the mother liquor itself or any thiosulphate subsequently recovered from it may be returned to storage tank E or to a fresh batch of liquor treated in evaporator R. The sodium thiosulphate crystals from the centrifuge S are mixed with some material high in carbon, such as coal, and with limestone, the three materials being finely divided and intimately admixed. Suitable proportions are one part sodium thiosulphate, one and one-half parts limestone, and one part coal, although the proportions may be varied as found desirable. The mixture is introduced into a suitable furnace, such as a muffle or reverberatory furnace V and heated to a high temperature, such as 1000° C. During the heating the mixture is preferably stirred in any convenient manner. The fused mass is then withdrawn from the furnace and leached with water in the leaching apparatus W. The resulting solution contains principally sodium carbonate although other soluble alkalies may be present. This solution is suitable for use in the gas purification system. The solution is separated from any carbonaceous material by filtration and returned to the circulating system where it is placed in tank A in sufficient amounts to maintain the strength of the circulating solution at the desired percentage of alkalinity. The sodium carbonate recovered from the liquor treated in evaporator R is also added to this solution, so that all of the alkali sodium compounds originally used are recovered and returned to the circulating system, with the exception of any that may have been lost mechanically or through the formation of thiocyanate.

An alternate method of converting the sodium thiosulphate to carbonate is to heat the sodium thiosulphate by itself in a suitable furnace, such as a muffle or reverberatory furnace, to a high temperature. The fused mass is then withdrawn from the furnace, mixed with coal and limestone and again heated to a high temperature in the furnace, the process being completed as described above. This alternative method is the specific subject of the co-pending application of the same applicants filed May 19, 1925, Serial No. 31457.

The sodium thiosulphate decomposes at a high temperature and the decomposed products react with the coal and limestone, forming principally sodium carbonate although other soluble alkalies such as sodium sulphide may be formed.

The invention as hereinabove set forth may be variously embodied within the scope of the claims hereinafter made.

We claim:

1. In a cyclic process for the purification of gases in which the gas is washed by an alkali-metal carbonate solution which passes cyclically back and forth through the gas washing stage and through an aeration stage, the latter involving the formation of alkali-metal thiosulphates in the solution, the improvement characterized by recovering such thiosulphates from the solution, heating the recovered thiosulphates admixed with carbonaceous material and limestone to convert them to carbonates and restoring the thus recovered carbonates to the gas washing solution and thereby substantially maintaining the solution at the alkalinity required for the continuous washing of the gases; substantially as specified.

2. In a cyclic process for the purification of gases in which the gas is washed by a sodium carbonate solution which passes cyclically back and forth through the gas washing stage and through an aeration stage, the latter involving the formation of sodium thiosulphates in the solution, the improvement characterized by recovering such thiosulphates from the solution, heating the recovered thiosulphates admixed with carbonaceous material and limestone to convert them to carbonates and restoring the thus recovered carbonates to the gas washing solution and thereby substantially maintaining the solution at the alkalinity required for the continuous washing of gases; substantially as specified.

3. In a cyclic gas purification process in which the gas is washed by an alkali-metal carbonate solution which passes cyclically back and forth through the gas washing stage and through an aeration stage, the latter involving the formation of alkali-metal thiosulphates in the solution, the improvement characterized by recovering such thiosulphates from the solution and converting them to carbonates, and restoring the thus recovered carbonates to the gas washing solution and thereby substantially maintaining the solution at the alkalinity required for the continuous washing of gases; substantially as specified.

4. The process of producing alkali-metal carbonates which consists in mixing an alkali thiosulphate with carbonaceous material and limestone, subjecting the admixture to heating to convert the thiosulphate to carbonate, and separating the alkali-metal carbonate from the residual carbonaceous material; substantially as specified.

5. The process of producing alkali-metal carbonates which consists in mixing an alkali thiosulphate with coal and limestone, subjecting the mixture to heating to convert the thiosulphate to carbonate, and separating the alkali-metal carbonate from the residual coal; substantially as specified.

6. In the recovery of alkali as alkali-carbonates from gas purification liquors containing alkali-metal thiosulphates, the improvement consisting in recovering such thiosulphates from said liquors in solid form and heating the recovered thiosulphates admixed with carbonaceous material and limestone to convert them to alkali-carbonates.

In testimony whereof we have hereunto set our hands.

FREDERICK W. SPERR, Jr.
DAVID L. JACOBSON.